US007979756B2

(12) United States Patent
Dickens et al.

(10) Patent No.: US 7,979,756 B2
(45) Date of Patent: Jul. 12, 2011

(54) APPARATUS, SYSTEM AND METHOD FOR A GO/NO GO LINK INTEGRITY TESTER

(75) Inventors: Louie A. Dickens, Tucson, AZ (US); Tara Astigarraga, Vail, AZ (US); David Dehaan, Tucson, AZ (US); Omolaoye Olatunde-Bello, Tuscon, AZ (US); Shelly L. Gerndt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 12/410,634

(22) Filed: Mar. 25, 2009

(65) Prior Publication Data

US 2010/0251030 A1    Sep. 30, 2010

(51) Int. Cl.
*G01R 31/28* (2006.01)
(52) U.S. Cl. .......................................... 714/715; 714/43
(58) Field of Classification Search .................. 370/236, 370/249, 395.21; 398/5; 714/712, 715; 713/43
See application file for complete search history.

(56) References Cited

U.S. PATENT DOCUMENTS

| 5,343,461 | A   | * | 8/1994 | Barton et al. | 370/249 |
| 6,434,716 | B1  | * | 8/2002 | Johnson et al. | 714/712 |
| 7,110,668 | B2  | * | 9/2006 | Gerstel et al. | 398/5 |
| 7,231,558 | B2  |   | 6/2007 | Gentieu et al. | |
| 7,397,801 | B2  | * | 7/2008 | Zuberi et al. | 370/395.21 |
| 7,411,911 | B2  | * | 8/2008 | Huotari et al. | 370/236 |
| 2007/0087615 | A1 |  | 4/2007 | Paulsen et al. | |
| 2007/0245198 | A1 |  | 10/2007 | Betawar et al. | |
| 2010/0095160 | A1 | * | 4/2010 | Dickens et al. | 714/43 |

* cited by examiner

*Primary Examiner* — David Ton
(74) *Attorney, Agent, or Firm* — Connolly Bove Lodge & Hutz LLP; Robert Sullivan, Esq.

(57) ABSTRACT

An apparatus, system and method for a go/no go tester that uses various data patterns to assure that equipments, systems and networks using data links, receivers and transmitters are working within the range of predetermined requirements of standards, specifications and protocols. The apparatus, system and methods can be used in at least one of SAS/SATA and Fiber Channel systems based on integrated circuit devices used within the apparatus of the invention.

1 Claim, 7 Drawing Sheets

APPARATUS, SYSTEM AND METHOD FOR A GO/NO GO LINK INTEGRITY TESTER

FIELD OF THE INVENTION

The present invention relates generally to error detection in high speed data transmission systems and components. More particularly, embodiments of the present invention concern error rate testing apparatus and methods suitable for use in connection with various network protocols and configurations.

BACKGROUND OF THE INVENTION

The ever-increasing demand for higher data rates and bandwidth has resulted in the development of technology that increases the amount of data that can be pushed through a single channel. Advancements in modulation techniques, coding algorithms and error correction have vastly increased the data rates that can be transmitted. As an example, at one time the highest data rate that could travel across a network or link was at about one Gigabit per second. Over time, this rate has increased to the point where data can travel across networks such as, but not limited to: Gigabit Ethernet and Synchronous Optical Network (SONET) and Fibre Channel, at rates as high as 10 gigabits per second, or faster. These networks, and others, typically conform to at least one of a number of established standards, specification or protocols. Such standards are used to set the rules governing network access as well as communications between resources, such as transmitters, data links and receivers, that make up a piece of equipment, system or network.

Equipment, systems and networks at these higher data rates use embedded clocks and typically have a greater susceptibility to data link problems. These data link problems include, but are not limited to: jitter, reduced signal integrity and degradation of bit error rate (BER) performance. Background art apparatus and methods for determining whether jitter, signal integrity, or degrading bit error rates problems exist are typically: (1) very complex; and (2) require a great deal of expertise in the area of electronics and signal analysis. Without such complex apparatus and methods, there currently is no simple way to determine if the data link problems discussed above exist in equipments, systems and networks. Therefore, there is a need in the art for apparatus and methods that detect data link problems in equipment, systems and networks with high data rates.

SUMMARY OF THE INVENTION

Embodiments of the present invention are directed to apparatus and methods for a go/no go tester that uses various data patterns to assure that equipments, systems and networks using data links, receivers and transmitters are working within a range of predetermined requirements of standards, specifications and protocols. The apparatus and methods can be used in at least one of SAS/SATA and Fibre Channel systems based on integrated circuit devices used within the apparatus of the invention.

In particular, embodiments of the present invention use off-the-shelf integrated circuit devices implementing at least one of SAS/SATA, Fibre Channel and other protocols which include but are not limited to: PMC-Sierra, PM8001 Tachyon, SPC 8X6G for Fibre Channel, PMC-Sierra PM8032 Tachyon Qe-8. The apparatus and methods of the invention will perform any setup required by the protocol in order to be able to send inputs and outputs that include, but are not limited to: logins and/or discover. The apparatus and methods of the invention will write data with a specified data pattern, burst size and block size, wherein the amount of data is at least one of specified by a user or chosen randomly and wherein the amount of data, specified data pattern, burst size and block size are at least one of specified by the user and sequential data patterns chosen by default. The data will be written using the parameters specified above. Once the data has been written to the unit-under-test (UUT) in accordance with the parameters discussed above, the data will be read and checked by the apparatus and methods of the invention against what was originally written and any error information will be provided to the end user to determine the performance of the UUT.

One embodiment of the invention is an apparatus for optical and other high rate networks for testing a network path from a first network location to a second network location, said apparatus comprising: a test source located at said first network location for cooperation with a test sink located at said second network location, said test source and sink coupled together by said network; said test source further comprising a network interface, processor and memory coupled to a network interface, said processor arranged to: couple a selectable test pattern to said network via said network interface, create a first record as a result of said coupling, receive a response pattern from said network interface in response to the coupling of said test pattern, create a second record as a result of said receiving, and output a report based on said first and second records. In addition, the apparatus includes wherein said test pattern is user selectable, and wherein said processor selects said test pattern.

Another embodiment of the invention is a method for determining data link integrity, comprising: writing a predetermined amount of data with a specified data pattern, burst size and block size, wherein the predetermined amount of data is at least one of specified by a user or chosen randomly, and wherein the predetermined amount of data, a specified data pattern, a burst size and a block size for the predetermined amount of data are at least one of specified by the user and a sequential data pattern is chosen by default. The method of the embodiment further comprises: creating a first record as a result of said coupling; receiving a response pattern from said test device in response to the coupling of said test pattern; creating a second record as a result of said receiving, and outputting a report based on said first and second records. In addition, the method includes wherein said test pattern is user selectable, and wherein said processor selects said test pattern.

Embodiments of the invention use an off-the-shelf fibre and/or /SAS/SATA integrated circuit to perform data integrity testing by sending various data patterns to the UUT that are verified for accuracy when the data patterns are read back to the apparatus and analyzed by the methods of the invention.

Yet another embodiment of the invention uses known data patterns that exaggerate problems, such as jitter. In this embodiment the apparatus of the invention would be used to send data while changing the settings that are internal to the fibre chip that are known to effect jitter and signal integrity.

Yet another embodiment of the invention discloses a system for high rate networks for testing a network path from a first network location to a second network location, said apparatus comprising: a test source located at said first network location for cooperation with a test sink located at said second network location, said test source and sink coupled together by said network, said test source further comprising a network interface, processor and memory coupled to a network interface, said processor further coupling a selectable test pattern to said network via said network interface, creating a first record as a result of said coupling, receiving a response pattern from said network interface in response to the coupling of said test pattern, creating a second record as a result of said receiving, and outputting a report based on said first and second records, wherein said network interface is at least one of a Fibre Channel and SAS/SATA integrated circuit, wherein said test pattern is user selectable, and wherein said processor selects said test pattern.

In addition, the apparatus, methods and systems of embodiments of the invention may operate in several modes, including, but not limited to: (1) Automatic Mode; User Select Mode; and Chip Setting Mode. Specifically, in Automatic Mode, the apparatus and method will send all possible random data patterns starting at 00 thru ff using random burst and block sizes and random amounts of data. In User Select Mode, the apparatus and method has the user specify the data pattern or a range of data patterns to use, the burst size and block sizes (if applicable) and how much data to be written and read. In the Chip Setting Mode, the user would specify the setting in the chip to change and the value of the setting and then further choose either Automatic Mode or User Select mode to verify the effect of changing the chip settings. In each of the modes discussed above, the end user will receive a report of success, failure and any other information that is applicable and available. One non-limiting example could be that a data verification failed on data pattern ff at offset 261 using burst size of 64 k.

BRIEF DESCRIPTION OF THE DRAWINGS

The invention can be described in greater detail with the aid of the following drawings.

DETAILED DESCRIPTION OF THE PREFERRED EMBODIMENT

Figure 1:
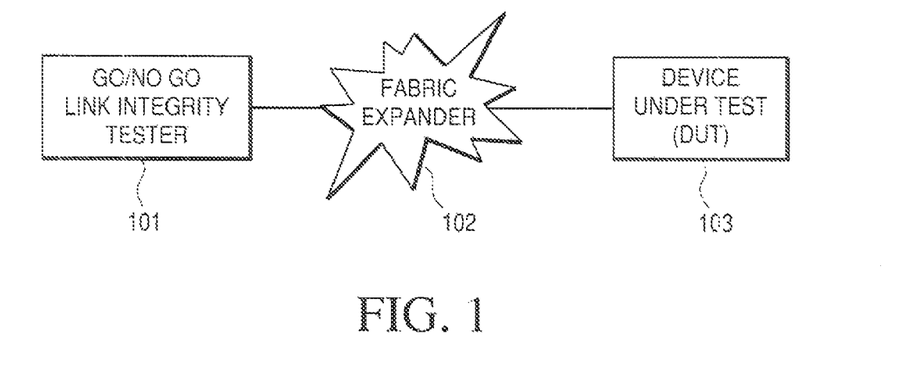
FIG. 1 is an exemplary embodiment of a topology for a simple go/no go apparatus and method.
Figure 2:
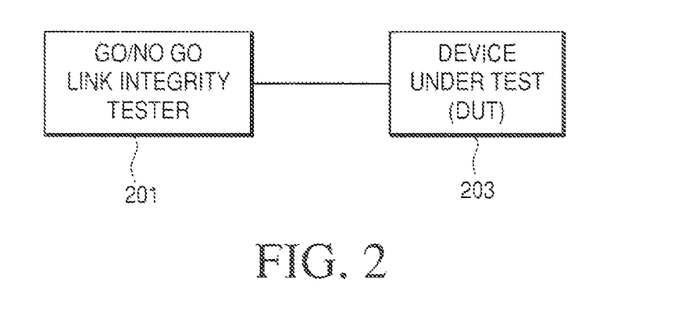
FIG. 2 is another exemplary embodiment of a topology for the simple go/no apparatus and method.

As shown in FIG. 1, the simple go/no go link integrity tester 101 and fabric expander 102 apparatus are interconnected to do data verification between the integrity tester 101 and the device-under-test (DUT) 103. By sending traffic over data links between the integrity tester 101, fabric expander 102 and the DUT 103, data verification between the integrity tester 101 and the DUT 103 link operation is verified by default. Alternatively, as shown in FIG. 2, the simple go/no go link integrity tester 201 does data verification between the link integrity tester 201 and the DUT 203.

Figure 3:
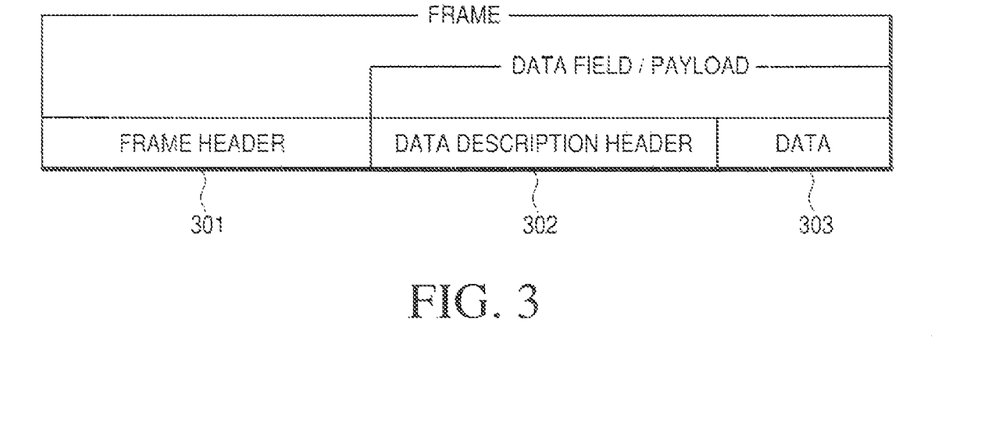
FIG. 3 is a non-limiting example of a data description header for the data to be written to a device-under-test.

FIG. 3 shows an exemplary data description header. As shown in FIG. 3, the data description header further comprises a frame header 301, data description header 302 and the data 303. The data 303 is going to be written to the DUT 103, 203. This description header typically includes, but is not limited to information such as the data pattern, burst size, block size, file size and any other data that could be applicable or useful in analyzing the performance of DUT 103, 203 in data verification. When the data is read back to the apparatus and method of the invention, the data 303 in the data description header 302 will be used to assure the data was written and read back from the DUT 103, 203 correctly.

In particular, the frame header 301 describes the data that has been written, the header could include, but is not limited to such information as: data pattern, amount of data written, seed of the data pattern (e.g., randomly generated), starting logical block address (lba), or any other information that is needed to determine that the data being read is the same data that was written.

Figure 4:
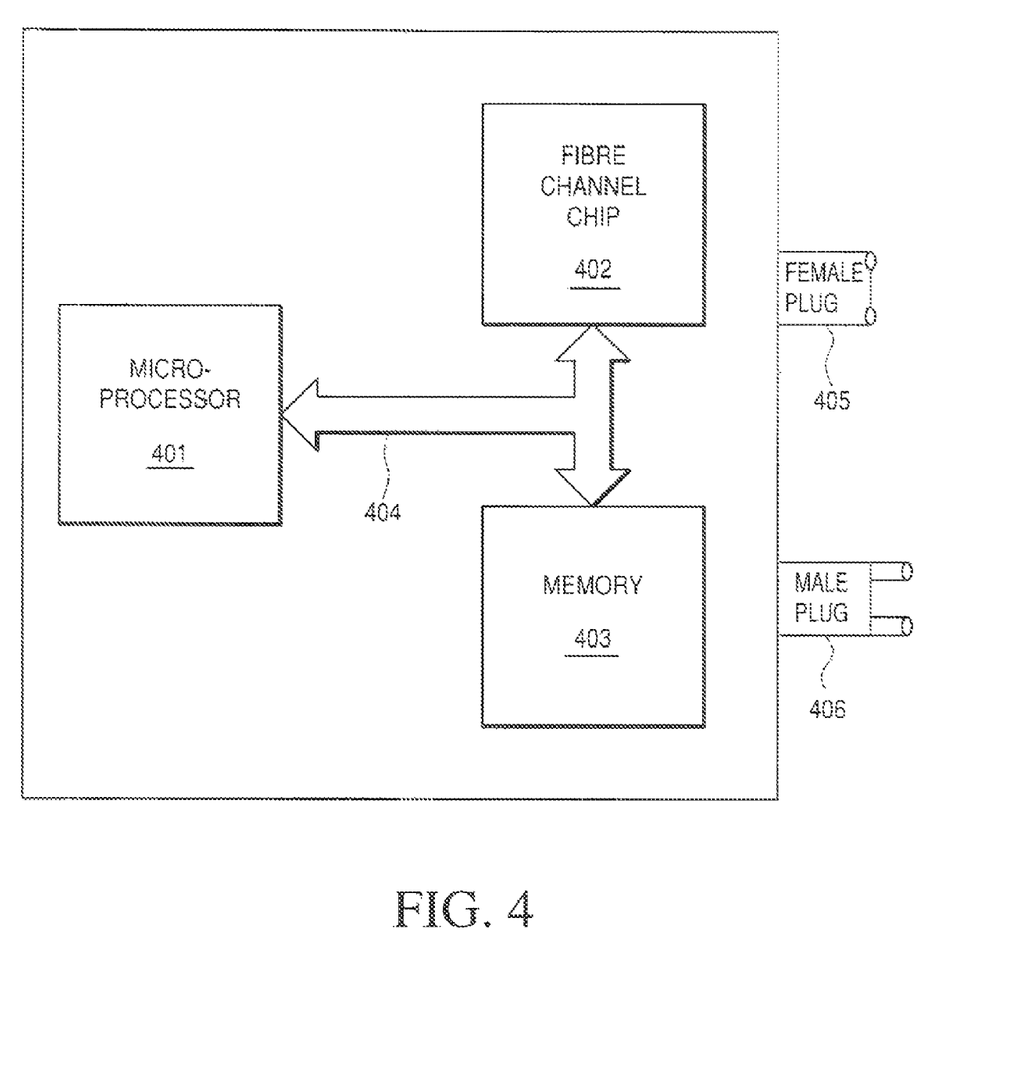
FIG. 4 shows an exemplary hardware architecture for the link integrity tester.

FIG. 4 shows an exemplary hardware architecture for the link integrity tester 101. As shown in FIG. 4, the exemplary hardware architecture further comprises: a microprocessor 401; a fibre channel interface 402; and memory 403. These components communicate via a system bus 404. Memory 403 can be at least one of flash memory, a hard disk, optical storage, solid-state memory, or any other type of memory medium or a mixture of the above-discussed memory types. The microprocessor 401 controls the operation of the link integrity tester 101.

Figure 5:
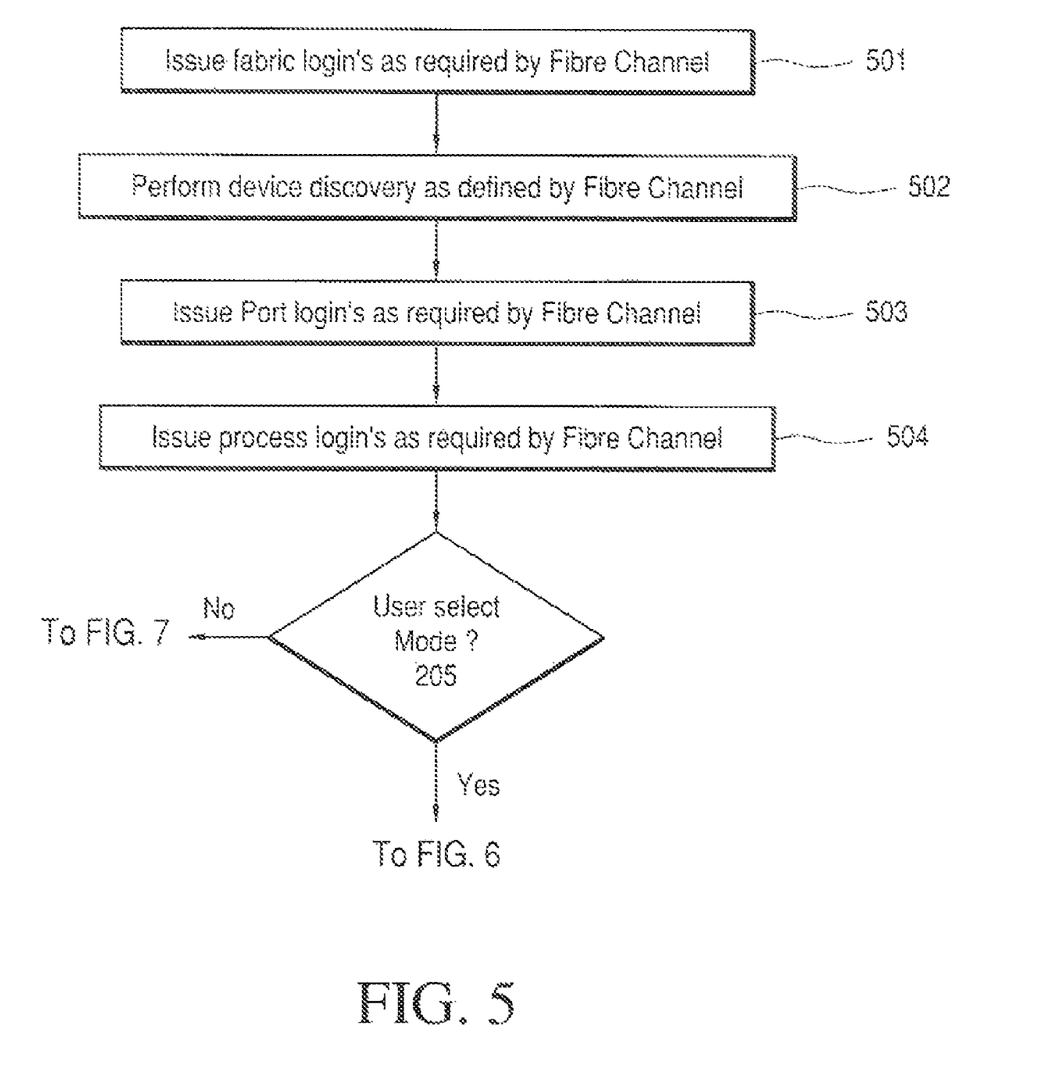
FIG. 5 shows an exemplary flow diagram of a method for login in embodiments of the invention.

FIG. 5 shows an exemplary method for Fibre Channel technology called "login." In step 501 of FIG. 5 is issuing a frame called fabric login (flogi) which allows the link integrity tester 101 to talk to the fabric expander 102 of FIG. 1. The link integrity tester 101 logs into the name server the fabric expander 102 and, in step 502, issues name server querys in performing device discovery to determine devices (e.g., transmitters and receivers) connected to the Fibre Channel. In particular, for Fibre Channel in SAS, the SMC discover protocol is performed. In step 503 and step 504, the fabric expander 102 is issuing port and process logins, respectively, to the devices that it discovered from the name server queries. In particular, for Fibre Channel, SAS does not perform logins. In step 505, a decision is made if the device is going to either run in USER SELECT MODE or automatic mode.

Figure 6:
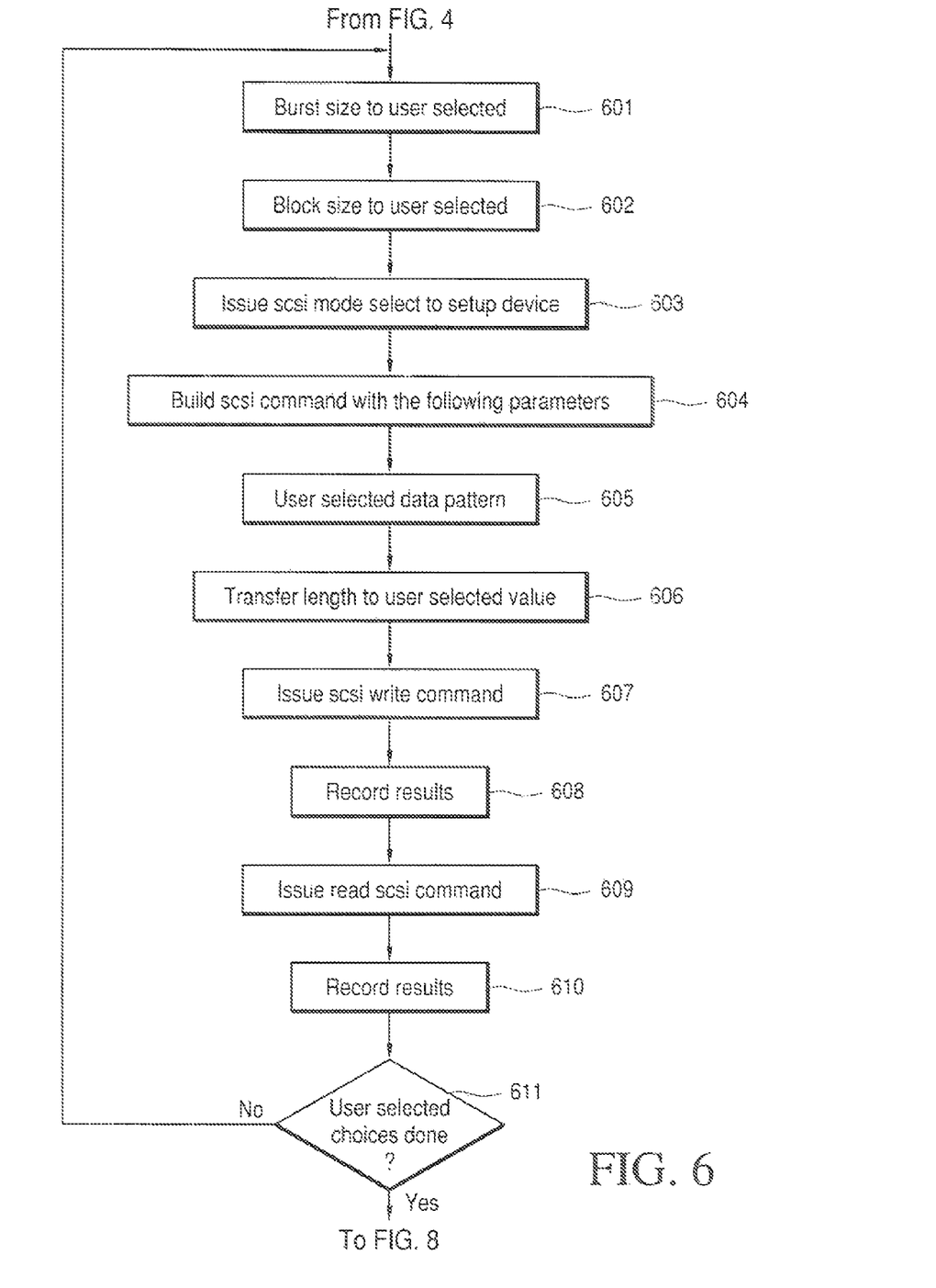
FIG. 6 shows an exemplary flow diagram of a method for the User Select Mode of operation of embodiments of the invention.

FIG. 6 shows exemplary steps in the method for the User Select Mode of operation. In step 601, a user specified block size will be set in the mode sense data. However, since not all DUTs 103, 203 allow the block size to be changed, if a DUT 103, 203 allows it, and the user selects this operation, the block size will be changed.

In step 602, a user specified burst size will be set in the mode sense data. Since not all DUTs 103, 203 allow the burst sue to be changed, so if a DUT 103, 203 allows it, and the user selects it the burst size will be changed.

In step 603, a scsi mode select command will be issued to the DUT 103, 203 to set the burst size and block size the user selected. In step 604, a scsi write and scsi read command will be built using the data pattern and transfer length the user previously selected and indicated in steps 605 and 606, respectively. In step 607, the data is written using all of the user selected values.

In step 608, the results of the scsi writes are recorded for reference later. In step 609, the data is read back by issuing a scsi command with the same user selected values discussed above. In the case of a stream device, a scsi command, such as space backward could be issued to position the stream device to read the data that was previously written.

In step 610, the results of the scsi reads are recorded for reference later. In step 611, a decision is made whether all the user selected burst sizes, block sizes, transfer lengths and data patterns are written and read has been completed. If not completed, the entire method of FIG. 6 repeats until all user selected values have been written and read.

Figure 7:
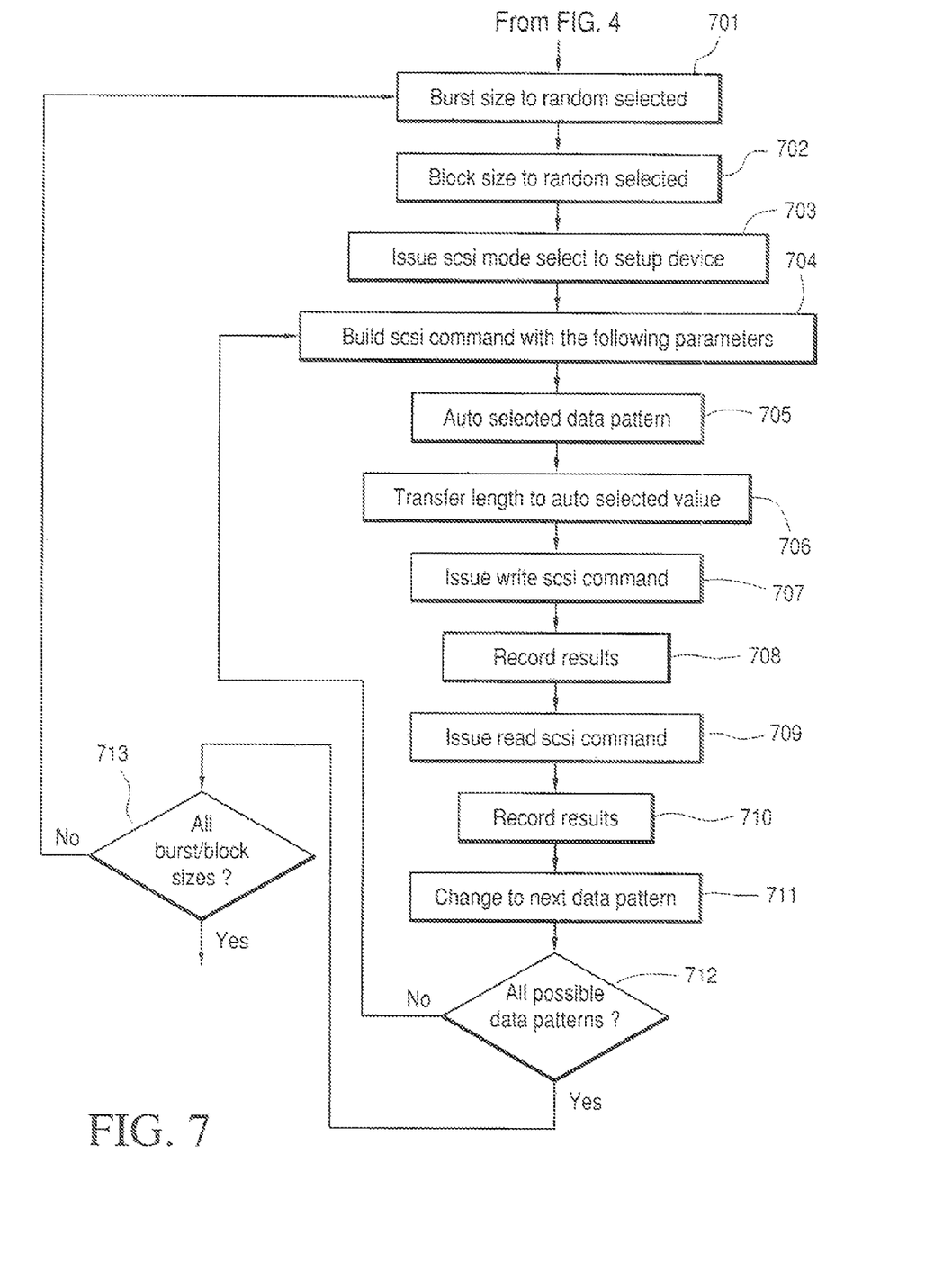
FIG. 7 shows an exemplary flow diagram of the method for the auto select mode of operation of embodiments of the invention.

FIG. 7 shows an exemplary flow diagram of the method of embodiments of the invention for the auto select mode of operation. In step 701, a burst size is issued in a range of at least one of 4 bytes or the lowest block size a device supports and up to at least a value of ffffff or the max burst size the device supports. In addition, a different value of burst size will be selected each time through the loop until all possible combinations of burst size have been issued.

In step 702, a block size is issued in a range of at least one of 4 bytes and the lowest block size a device supports and up to at least a value of ffffff or the max block size the device supports. In addition, a different value of block size will be selected each time through the loop until all possible combinations of block size have been issued. Further, a scsi mode select command will be issued to the device under test to set the burst and br block size selected in step 701 and step 702.

In step 704, a scsi write and scsi read command will be built using the data pattern and transfer length of step 705 and step 706, respectively. The data patterns for use in step 705 will start at all 0's and increment by 1 until all possible values of data patterns have been tried. In addition, the transfer lengths of step 706 will start at the lowest valid value and increment by 4 (i.e., the word boundary is fibre channel requirement) to the maximum valid value.

In step 707, the data is written using all of the selected values. In step 408, the results of the scsi writes are recorded for reference later. In step 709, the data is read back using a scsi read command with the same user selected values. In the case of a streaming device a scsi command such as space-backward could be issued to position the streaming device to read the data that was just written.

In step 710, the results of the scsi reads are recorded for reference later. In step 711, a decision is made if the completion all the automatically selected burst sizes, block sizes, transfer lengths and data patterns have been written and read. If all possible combinations have not been written and read, then the method of FIG. 7, repeats until all automatically selected values have been written and read.

Figure 8:
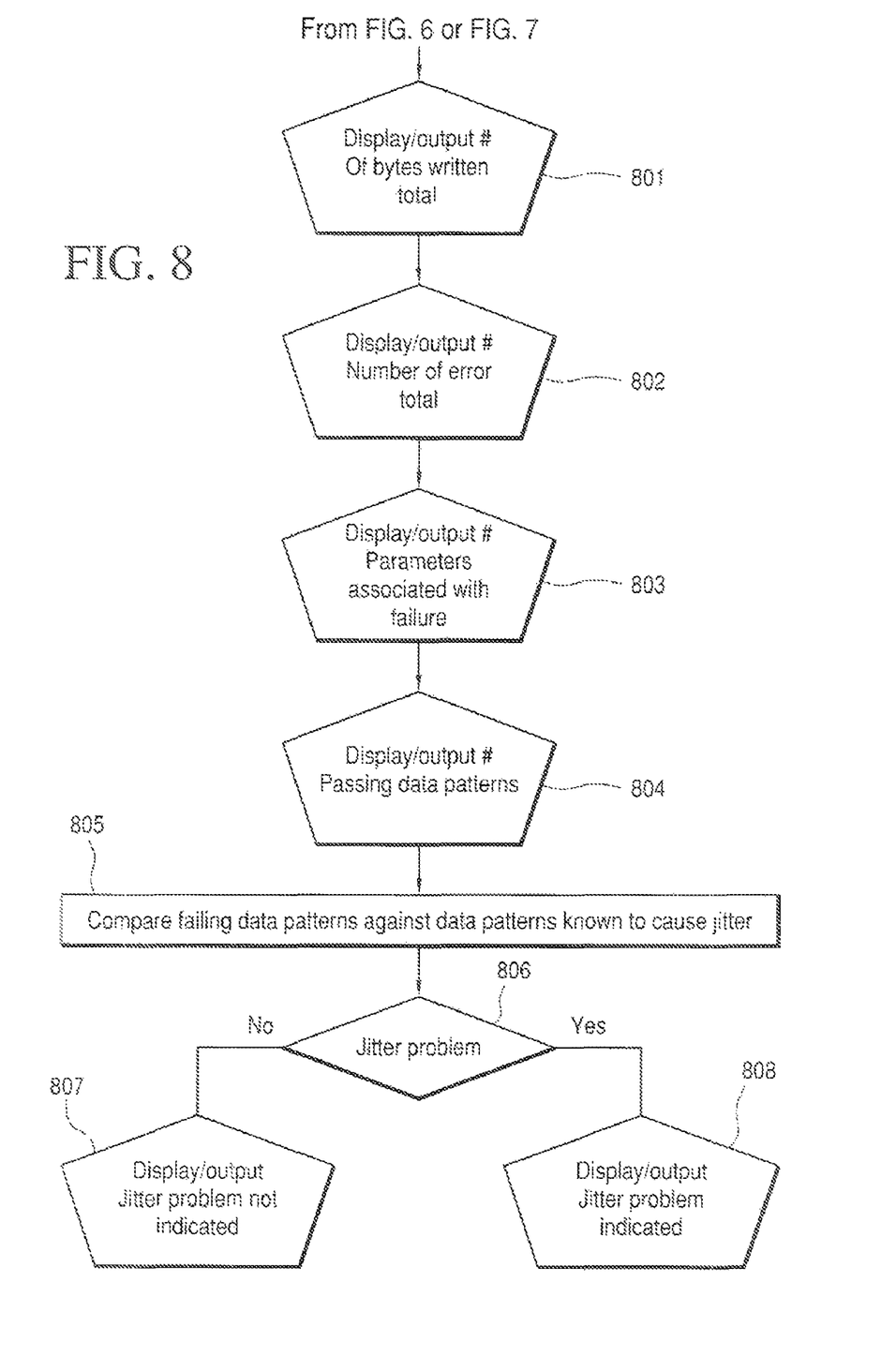
FIG. 8 shows an exemplary flow diagram of the method used to inform the user of the results of test that have obtained by the embodiments of the invention.

FIG. 8 shows the steps that are used to inform the user of the results of test that have been performed. In step 801, the results from the link integrity tester 101 can be provided in any form that allows the end user to interpret them. Some examples of how these results can be presented include, but are not limited to: an LCD screen and an output to a file. outputs the number of bytes read and written. In particular, step 802 outputs the number of errors that occurred during the reading and writing of data. Step 803 outputs the values of block size, burst size, transfer length and the data patterns that failed to be written or read are output. Step 804 outputs a summary of all the values of block size, burst size, transfer length and data patterns that passed. Step 805 compares the failing data patterns with data patterns that are known to cause jitter. Step 806 displays the level of jitter problems detected. If the failures are not failures with known jitter patterns the user will get a message indicating jitter is not a problem in step 807. If the failures are failures with known jitter patterns the user will get a Message indicating jitter may be a problem in step 808.

Figure 9:
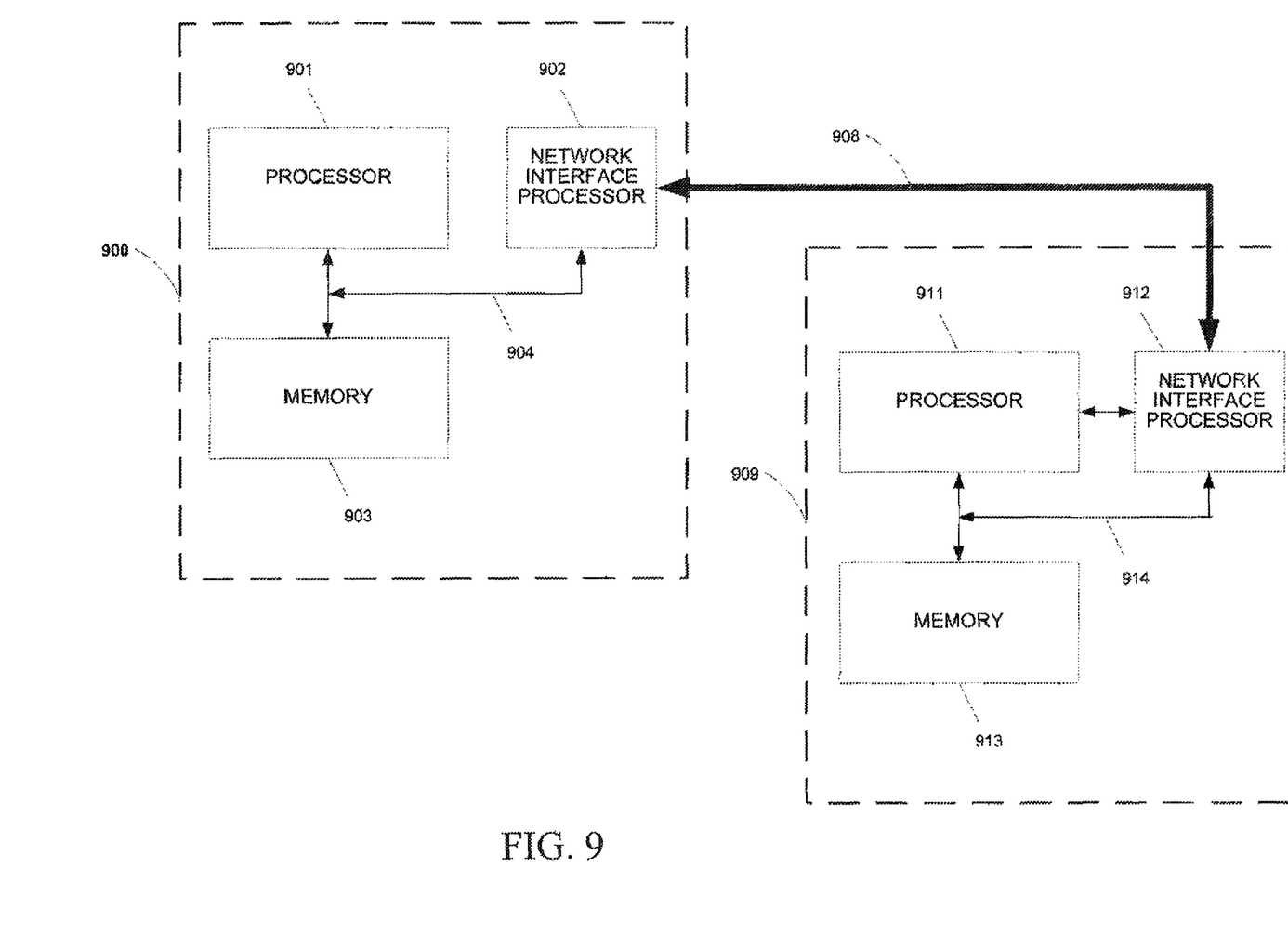
FIG. 9 shows an exemplary block diagram of a system using the apparatus and method of the link integrity tester defined by embodiments of the invention.

FIG. 9 shows and system diagram of an exemplary embodiment of the invention. In particular, FIG. 9 discloses a system for high rate networks and for testing a network 908 from a first network location to a second network location, said system comprising: a test source 900 located at said first network location for cooperation with a test sink 909 located at said second network location. The test source 900 and test sink 909 are coupled together by said network 908, said test source 900 further comprising a network interface 902, processor 901 and memory 903 coupled to the network interface 902, said processor 901 further coupling a selectable test pattern, located in said memory 903, to said network 908 via said network interface 902, creating a first record as a result of said coupling, receiving a response pattern from said network interface 902 from over the network 908 in response to the coupling of said test pattern, creating a second record as a result of said receiving, and outputting a report based on said first and second records, wherein said network interface 902 is at least one of a Fibre Channel and SAS/SATA integrated circuit, wherein said test pattern is user selectable and located in memory 903, and wherein said processor selects said test pattern.

The foregoing description illustrates and describes the present invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such or other embodiments and with the various modifications required by the particular applications or uses of the invention. Accordingly, the description is not intended to limit the invention to the form or application disclosed herein. Also, it is intended that the appended claims be construed to include alternative embodiments.

What is claimed is:

1. A system for testing a network path from a first network location to a second network location, said apparatus comprising:

a test source located at said first network location for cooperation with a test sink located at said second network location, said test source and sink coupled together by said network, said test source further comprising a network interface, processor and memory coupled to a network interface, said processor further coupling a selectable test pattern to said network via said network interface, creating a first record as a result of said coupling, receiving a response pattern from said network interface in response to the coupling of said test pattern, creating a second record as a result of said receiving, and outputting a report based on said first and second records, wherein said network interface is at least one of a Fibre Channel and SAS/SATA integrated circuit, wherein said test pattern is user selectable, and wherein said processor selects said test pattern.

* * * * *